United States Patent
Pacala et al.

(10) Patent No.: US 10,036,803 B2
(45) Date of Patent: Jul. 31, 2018

(54) THREE-DIMENSIONAL LIDAR SENSOR BASED ON TWO-DIMENSIONAL SCANNING OF ONE-DIMENSIONAL OPTICAL EMITTER AND METHOD OF USING SAME

(71) Applicant: QUANERGY SYSTEMS, INC., Sunnyvale, CA (US)

(72) Inventors: Angus Pacala, San Francisco, CA (US); Louay Eldada, Sunnyvale, CA (US)

(73) Assignee: Quanergy Systems, Inc., Sunnyvale, CA (US)

( * ) Notice: Subject to any disclaimer, the term of this patent is extended or adjusted under 35 U.S.C. 154(b) by 435 days.

(21) Appl. No.: 14/517,948

(22) Filed: Oct. 20, 2014

(65) Prior Publication Data

US 2017/0299700 A1 Oct. 19, 2017

(51) Int. Cl.
*G01S 7/481* (2006.01)
*G01S 17/10* (2006.01)

(52) U.S. Cl.
CPC .......... *G01S 7/4817* (2013.01); *G01S 7/4813* (2013.01); *G01S 17/10* (2013.01)

(58) Field of Classification Search
CPC ........ G01S 17/42; G01S 17/89; G01S 7/4814; G01S 7/4817
See application file for complete search history.

(56) References Cited

U.S. PATENT DOCUMENTS

| | | |
|---|---|---|
| 4,542,986 A | 9/1985 | Berdanier |
| 8,836,922 B1 | 9/2014 | Pennecot et al. |
| 8,953,647 B1 * | 2/2015 | Mead .................. H01S 3/06754 12/94 |
| 2003/0090646 A1 | 5/2003 | Riegl et al. |
| 2007/0279615 A1 | 12/2007 | Degnan et al. |
| 2008/0278715 A1 | 11/2008 | Swenson et al. |
| 2009/0278030 A1 | 11/2009 | Deliwala |
| 2011/0255070 A1 | 10/2011 | Phillips et al. |
| 2012/0281293 A1 | 11/2012 | Gronenborn et al. |
| 2013/0027715 A1 | 1/2013 | Imaki et al. |
| 2014/0211194 A1 * | 7/2014 | Pacala .................... G01S 17/06 356/5.01 |

(Continued)

FOREIGN PATENT DOCUMENTS

WO   WO 2016064915 A1 *  4/2016  ............. G01S 17/42

OTHER PUBLICATIONS

International Search Report and Written Opinion issued to international patent application No. PCT/US15/56516, dated Feb. 4, 2016, 7 pgs.

(Continued)

*Primary Examiner* — Daniel Pihulic
(74) *Attorney, Agent, or Firm* — Cooley LLP

(57) ABSTRACT

An apparatus and method are used for three-dimensional sensing with a time-of-flight lidar sensor having a single emitter sensing in one dimension, at least one photodetector, and a mechanical means of scanning in two dimensions said emitter and at least one photodetector. The external case of the lidar is preferably static, and only internal components involve mechanical motion. In a preferred embodiment of said lidar when operated in the infrared, said external static case has a window that is visually opaque and essentially transparent to infrared radiation.

3 Claims, 3 Drawing Sheets

(56) References Cited

U.S. PATENT DOCUMENTS

2014/0240691 A1    8/2014  Mheen
2015/0192677 A1*   7/2015  Yu .................... G01S 17/936
                                                        356/5.01
2015/0219765 A1*   8/2015  Mead ................ H01S 3/06754
                                                        356/5.09
2015/0293224 A1*  10/2015  Eldada ................ G01S 7/4814
                                                        250/206.1
2016/0047901 A1*   2/2016  Pacala ................ G01S 7/4813
                                                        356/5.01
2016/0161600 A1*   6/2016  Eldada .................. G01S 17/89
                                                        356/5.01

OTHER PUBLICATIONS

Extended European Search Report dated Jun. 6, 2018, for EP Application No. 15 852 806.7, filed on Oct. 20, 2015, 6 pages.

* cited by examiner

THREE-DIMENSIONAL LIDAR SENSOR BASED ON TWO-DIMENSIONAL SCANNING OF ONE-DIMENSIONAL OPTICAL EMITTER AND METHOD OF USING SAME

REFERENCES CITED

U.S. Patent Documents

| | | |
|---|---|---|
| 5,455,669 | October 1995 | Wetteborn |
| 7,746,449 B2 | June 2010 | Ray |
| 7,969,558 B2 | June 2011 | Hall |
| 2011/0216304 A1 | September 2011 | Hall |

FIELD OF THE INVENTION

The present invention relates generally to the field of environment sensing, and more particularly to cost-effective Time of Flight (ToF) lidar sensor apparatus for three-dimensional mapping and object detection, tracking and/or classification.

BACKGROUND OF THE INVENTION

A lidar sensor is a light detection and ranging sensor. It is an optical remote sensing module that can measure the distance to a target or objects in a landscape, by irradiating the target or landscape with light, using pulses from a laser, and measuring the time it takes photons to travel to said target or landscape and return after reflection to a receiver in the lidar module. Lidar sensors based on mechanical motion achieve a wide field of view. The cost and resolution of mechanical-motion lidar sensors containing multiple discrete individually packaged lasers are not optimal, as having a plurality of individually-packaged lasers is costly and scanning the environment in planes defined by individual collimated lasers does not achieve an acceptable resolution in some applications, especially ones where the lidar mounting platform is static (e.g., on a pole for use in road/intersection/traffic monitoring) or when the lidar mounting platform is generally mobile but has scenarios where it is static (e.g., a vehicle stopped at a traffic light that needs to sense pedestrians across the intersection, a situation where it cannot benefit from the laser beam sweeping obtained when the vehicle is moving/shaking/vibrating).

U.S. Pat. No. 5,455,669 discloses a laser range finding apparatus comprising a mirror mounted for rotation along a vertical axis parallel to the vertical axis of light from a pulsed laser being emitted for deflection into the measurement region, and angularly inclined with respect to the plane of rotation and the vertical axis to cause pulsed light from the collimated laser to be diverted over the planar measurement field and reflected light from the measurement region to be received from the planar measurement region and diverted along a vertical path to a photoreceiver arrangement.

U.S. Pat. No. 7,746,449 discloses a light detection and ranging system, comprising a collimated laser beam, a mirror unit rotating around a scan axis, the mirror unit including a receiving portion and a transmitting portion offset by an angle about the scan axis relative to a surface plane of the receiving portion, respective centroids of the receiving and transmitting portions being positioned at a common point on the scan axis.

U.S. Pat. No. 7,969,558 discloses a lidar-based 3-D point cloud system comprising a support structure, a plurality of laser emitters supported by the support structure, a plurality of avalanche photodiode detectors supported by the support structure, and a rotary component configured to rotate the plurality of laser emitters and the plurality of avalanche photodiode detectors at a speed of at least 200 RPM (rotations per minute).

US application 2011/0216304 discloses a LiDAR-based sensor system comprising a base, head assembly, a rotary component configured to rotate the head assembly with respect to the base, the rotation of the head assembly defining an axis of rotation; an electrical motherboard carried in the head assembly, the motherboard defining a plane and being positioned substantially parallel to the axis of rotation, a plurality of photon transmitters mounted to a plurality of emitter circuit boards, the plurality of emitter circuit boards being mounted directly to the motherboard, and a plurality of detectors mounted to a plurality of detector circuit boards, the plurality of detector circuit boards being mounted directly to the motherboard.

SUMMARY OF THE INVENTION

An apparatus and method are used for three-dimensional sensing with a time-of-flight lidar sensor having a single emitter and at least one photodetector. Said single emitter can comprise a single laser, a single laser bar, or multiple lasers (preferably in the form of an integrated multi-laser chip, or co-packaged laser chips, or a multi-chip module in a single package), and in all three cases the emitter output is imaged to form a radiation pattern whose envelope is elongated to provide one-dimensional sensing. Said single emitter can also comprise a single laser coupled to an optical phased array (OPA) that either images a radiation pattern whose envelope is elongated to provide one-dimensional sensing, or sweeps a beam in one dimension to provide one-dimensional sensing. Said single emitter can also comprise a single laser coupled to a diffractive optical element (DOE) or a holographic optical element (HOE), with either optical element imaging a radiation pattern whose envelope is elongated to provide one-dimensional sensing. For all single emitter configurations, a mechanical motion (e.g., spinning or mirror/prism/lens/DOE/HOE/grating scanning) is used to cover the two dimensions not covered by the emitter, resulting in three-dimensional sensing.

When a plurality of photodetectors are used, they preferably comprise an integrated multi-photodetector chip, or co-packaged photodetector chips, or a photodetection multi-chip module.

Photodetector types include single-photon avalanche diode (SPAD) arrays, avalanche photodiodes (APD) and PIN diodes (PIN diodes are positive-intrinsic-negative diodes, as they comprise a lightly-doped intrinsic semiconductor region between a a-type or positive-type semiconductor region and an n-type or negative-type semiconductor region).

As opposed to U.S. Pat. No. 5,455,669 and U.S. Pat. No. 7,746,449, the present invention does not have a static collimated laser in the dimension normal to the plane covered by the mechanical motion, but instead has an emitter than covers said normal dimension through imaging a radiation pattern whose envelope is elongated or through sweeping in said normal dimension.

As opposed to U.S. Pat. No. 7,969,558 and US application 2011/0216304 where the described apparatus comprises a plurality of emitters, the present invention comprises a single emitter. Also, as opposed to APDs, the present invention can use PIN diodes or preferably SPAD arrays. Furthermore, the head assembly is static as opposed to rotating, and only the internal turret is spinning when the mechanical motion consists of spinning, or an optical element (e.g., mirror, prism, lens, DOE, HOE, grating) is scanning when the mechanical motion consists of scanning. The entire external body of the lidar in the present invention is static.

BRIEF DESCRIPTION OF THE DRAWINGS

The following drawings are illustrative of embodiments of the present invention and are not intended to limit the invention as encompassed by the claims forming part of the application.

The schematic diagram of FIG. 1 provides an external view of the lidar 10 of one embodiment of the lidar of the present invention, depicting its static external case 20.

DETAILED DESCRIPTION OF THE INVENTION

Figure 1:
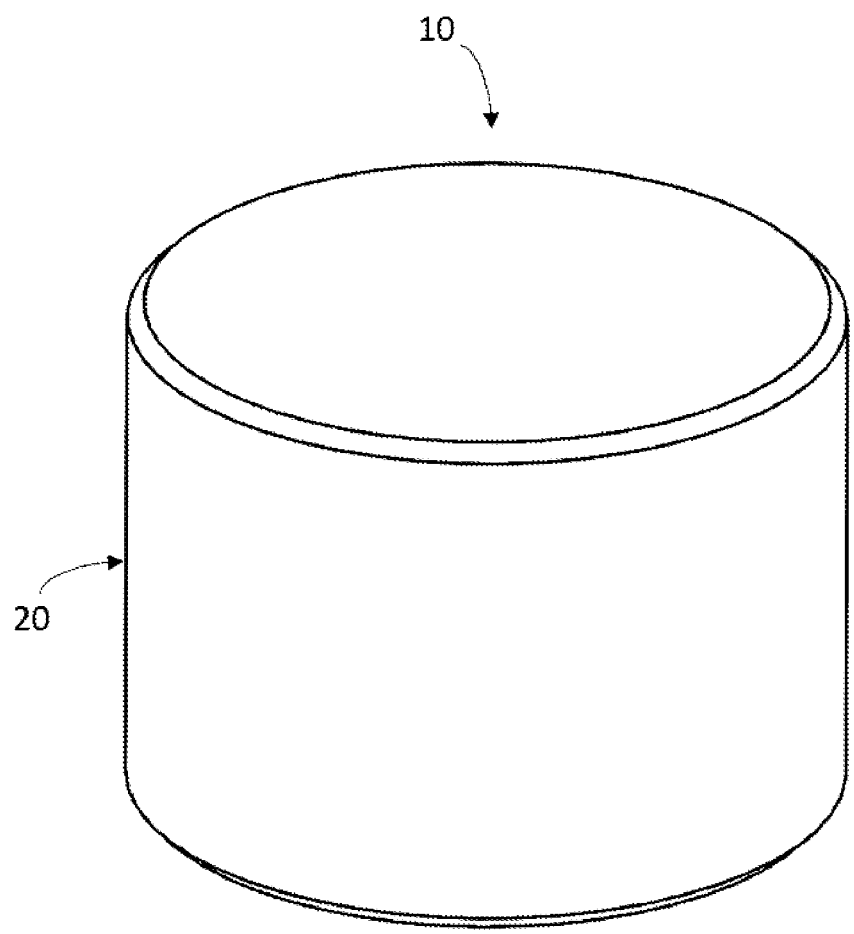
Figure 2:
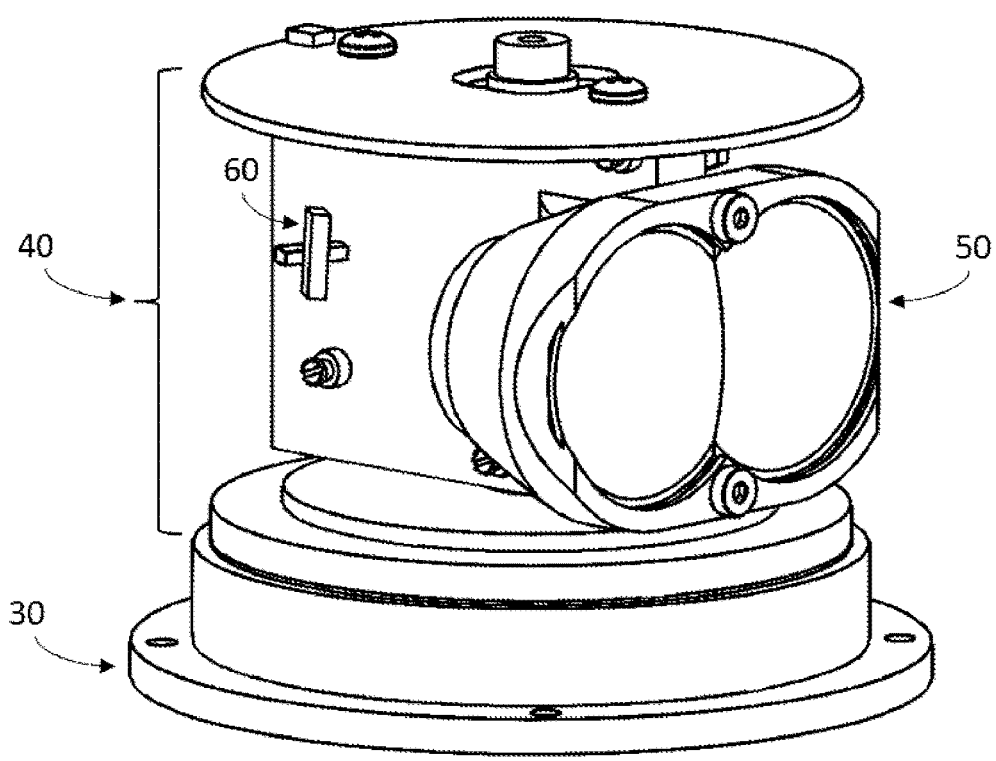
FIG. 2 provides an internal view of one embodiment of the lidar of the present invention angled as to show the emitting side, depicting an internal base 30, a spinning turret 40, an optical imaging assembly 50, and a single emitter 60.
Figure 3:
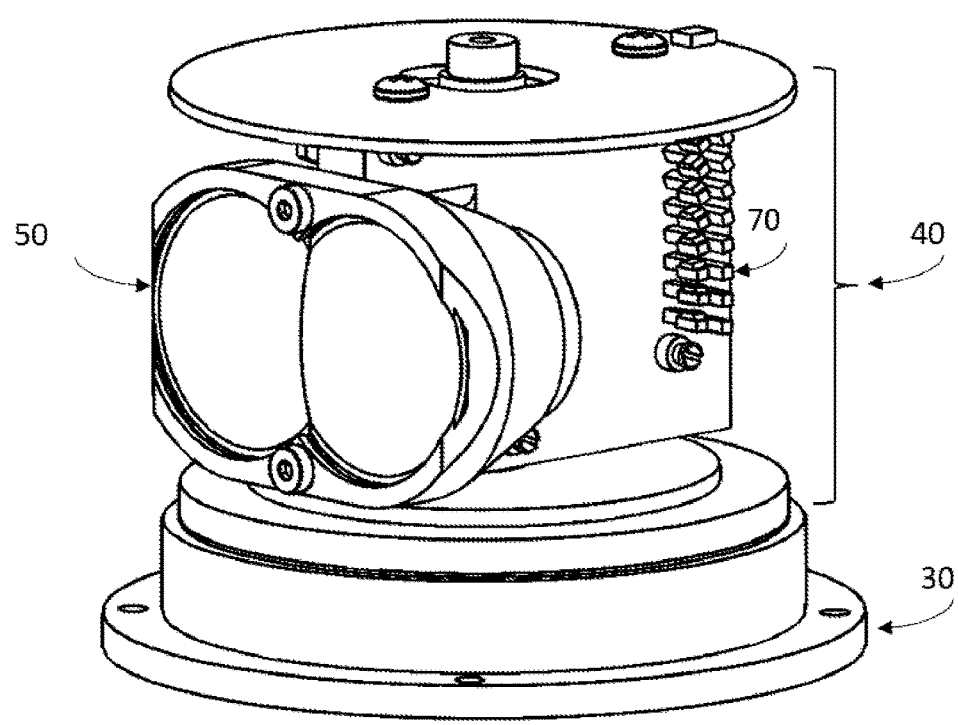
FIG. 3 provides an internal view of one embodiment of the lidar of the present invention angled as to show the receiving side, depicting an internal base 30, a spinning turret 40, an optical imaging assembly 50, and photodetectors 70.

An apparatus and method are used for three-dimensional sensing with a time-of-flight lidar sensor having a single emitter and at least one photodetector.

Said single emitter can comprise:
(a) a single laser
(b) a single laser bar
(c) multiple lasers (preferably in the form of an integrated multi-laser chip, or co-packaged laser chips, or a multi-chip module in a single package)
where in cases (a), (b) and (c) the emitter output is imaged to form a radiation pattern whose envelope is elongated to provide one-dimensional sensing
(d) a single laser coupled to an optical phased array (OPA) that images a radiation pattern whose envelope is elongated to provide one-dimensional sensing
(e) a single laser coupled to an optical phased array (OPA) that sweeps a beam in one dimension to provide one-dimensional sensing
(f) a single laser coupled to a diffractive optical element (DOE)
(g) a single laser coupled to a holographic optical element (HOE)
(h) a single laser coupled to a lens
where in cases (f), (g) and (h), the optical element images a radiation pattern whose envelope is elongated to provide one-dimensional sensing.

For all single emitter configurations, a mechanical motion is used to cover the two dimensions not covered by the emitter, resulting in three-dimensional sensing. The mechanical motion mechanism options include but are not limited to:
(a) spinning
(b) mirror scanning
(c) prism scanning
(d) lens scanning
(e) DOE scanning
(f) HOE scanning
(g) grating scanning When a plurality of photodetectors are used, they preferably comprise but are not limited to the following options:
(a) an integrated multi-photodetector chip
(b) co-packaged photodetector chips
(c) a photodetection multi-chip module Photodetector types include but are not limited to:
(a) SPAD arrays
(b) APDs
(c) PIN diodes The external case of the lidar in the present invention is preferably static, and only internal components involve mechanical motion. In a preferred embodiment of the present invention when operated in the infrared (IR), the window material of said case is visually opaque and IR transparent.

What is claimed is:

1. A time-of-flight lidar apparatus comprising: a) a single optical emitter sensing in one dimension, the single optical emitter being a single laser bar to form a radiation pattern whose envelope is elongated to provide one-dimensional sensing; b) at least one photodetector; c) a spinning turret rotating said emitter and at least one photodetector; and d) an external case that is static to encase the spinning turret, wherein the external static case has a window that is visually opaque and essentially transparent to infrared radiation emitted by the emitter on the spinning turret.

2. The apparatus of claim 1 wherein said at least one photodetector comprises one of a set of elements including but not limited to: a) single-photon avalanche diode arrays; b) avalanche photodiodes; c) positive-intrinsic-negative diodes.

3. The apparatus of claim 1 comprising a plurality of photodetectors in a form selected from a set comprising but not limited to: a) integrated multi-photodetector chip; b) co-packaged photodetector chips; c) photodetection multi-chip module.

* * * * *